US008471403B2

(12) United States Patent
Kähkipuro et al.

(10) Patent No.: US 8,471,403 B2
(45) Date of Patent: Jun. 25, 2013

(54) POWER SUPPLY ARRANGEMENT OF AN ELEVATOR

(75) Inventors: Matti Kähkipuro, Hyvinkää (FI); Joni Tähtinen, Laitila (FI); Jari Helvilä, Hyvinkää (FI); Pekka Hytti, Hyvinkää (FI)

(73) Assignee: Kone Corporation, Helsinki (FI)

( * ) Notice: Subject to any disclaimer, the term of this patent is extended or adjusted under 35 U.S.C. 154(b) by 74 days.

(21) Appl. No.: 12/941,339

(22) Filed: Nov. 8, 2010

(65) Prior Publication Data

US 2011/0068629 A1 Mar. 24, 2011

Related U.S. Application Data

(63) Continuation of application No. PCT/FI2009/050358, filed on May 4, 2009.

(30) Foreign Application Priority Data

May 20, 2008 (FI) ..................................... 20080364

(51) Int. Cl.
*H02J 1/12* (2006.01)
*H02J 3/32* (2006.01)
*H02J 3/34* (2006.01)

(52) U.S. Cl.
USPC ................. 307/46; 307/64; 307/66; 187/290; 187/247; 187/297

(58) Field of Classification Search
USPC ................................................ 307/46, 80, 64
See application file for complete search history.

(56) References Cited

U.S. PATENT DOCUMENTS

| | | | | |
|---|---|---|---|---|
| 6,422,351 | B2 * | 7/2002 | Tajima et al. | 187/290 |
| 7,085,123 | B2 * | 8/2006 | Shiue et al. | 361/301.2 |
| 7,331,426 | B2 * | 2/2008 | Jahkonen | 187/290 |
| 2001/0008195 | A1 | 7/2001 | Tajima et al. | |
| 2001/0017239 | A1 | 8/2001 | Tajima et al. | |
| 2004/0035646 | A1 | 2/2004 | Araki | |

FOREIGN PATENT DOCUMENTS

| | | | |
|---|---|---|---|
| JP | 8-169658 | A | 7/1996 |
| JP | 2002-348057 | A | 12/2002 |
| JP | 2002348057 | A * | 12/2002 |
| WO | WO 2006/016002 | A1 | 2/2006 |
| WO | WO 2007/077288 | A1 | 7/2007 |

* cited by examiner

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

The invention relates to a power supply arrangement of a transport system. The transport system comprises a motor for moving the transport appliance; a power supply circuit of the transport system, for supplying power between the power source of the transport system and the motor; a power controller of the energy storage, which power controller comprises at least one controllable switch; an energy storage, which is connected to the power supply circuit of the transport system via the power controller of the energy storage; and also a power control, which is fitted to control the aforementioned at least one controllable switch of the power controller of the energy storage, for adjusting at least one electrical magnitude relating to the power supply between the power supply circuit of the transport system and the energy storage. The power controller of the energy storage is fitted to discharge the aforementioned energy storage with a power limitation.

7 Claims, 5 Drawing Sheets

POWER SUPPLY ARRANGEMENT OF AN ELEVATOR

CROSS REFERENCE TO RELATED APPLICATIONS

Figure 1:
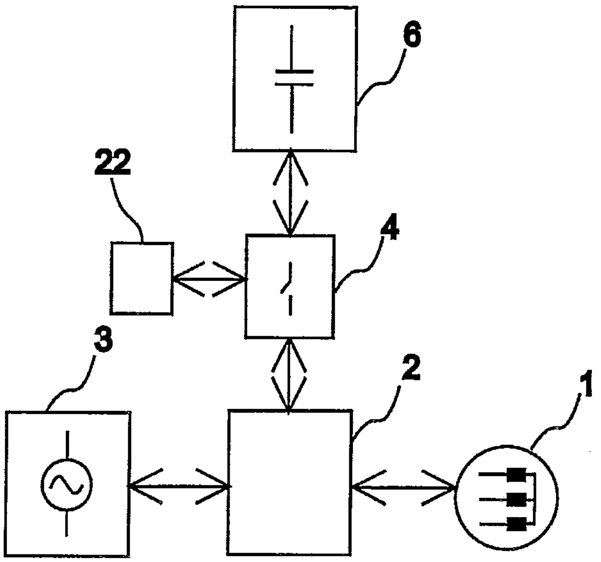

This application is a Continuation of PCT International Application No. PCT/FI2009/050358 filed on May 4, 2009, which claims the benefit of Patent Application No. 20080364 filed in Finland on May 20, 2008. The entire contents of all of the above applications is hereby incorporated by reference into the present application.

The object of the invention is a power supply arrangement of a transport system, an apparatus for storing energy, and also for discharging stored energy, and a method for supplying power in a transport system.

The power requirement of a transport system varies according to the loading and the control situation. The need for instantaneous power is affected also by, among other things, the inertia of the moving masses of the transport system. For example, in an elevator system with counterweight the power requirement during acceleration can be transiently over double compared to the power required during even speed. Since the mains electricity connection of the building is often dimensioned according to the maximum power needed, a fluctuation in the power supply in this case also affects the costs of the electricity supply of the building.

For the aforementioned reasons, it has been endeavored to develop solutions for evening out fluctuations in the power flow of the mains electricity connection. Publication U.S. Pat. No. 6,742,630 B2 presents an arrangement wherein an energy storage comprising supercapacitors is connected to the intermediate circuit of the frequency converter of an elevator. According to the publication electrical power is supplied from the energy storage to the intermediate circuit of the frequency converter to even out fluctuations in the power flow of the mains electricity connection.

The arrangement according to the publication contains problems. The compensation of fluctuations in the power flow of the mains electricity connection of a building requires a determination of the power flow of the mains electricity connection, which makes the control arrangement very complex. During operation of an elevator the transient power to be supplied from the energy storage to even out fluctuations in the power flow of the mains electricity connection can also in this case fluctuate strongly. The aforementioned fluctuation in the transient power to be taken from the energy storage makes determination of the total energy to be supplied from the energy storage during a run of the elevator difficult, in which case it is also difficult to ensure that the total energy available from the energy storage would be sufficient for the trip traveled by the elevator.

The purpose of this invention is to solve the aforementioned problems as well as the problems disclosed in the description of the invention below. The invention presents a new type of method to control the power supply of an energy storage in a transport system. The control arrangement of the energy storage according to the invention is also simpler than prior art, and fitting the energy storage into the transport system is thus easier than in prior art.

The power supply arrangement of a transport system according to the invention is characterized by what is disclosed in the claims. The apparatus for storing energy, and also for discharging stored energy, according to the invention is characterized by what is disclosed in the claims. The method according to the invention for supplying power in a transport system is characterized by what is disclosed in the claims. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The power supply arrangement of a transport system according to the invention comprises a motor for moving the transport appliance; a power supply circuit of the transport system, for supplying power between the power source of the transport system and the motor; a power controller of the energy storage, which comprises at least one controllable switch; and energy storage, which is connected via the power controller of the energy storage to the power supply circuit of the transport system; and also a power control, which is fitted to control the aforementioned at least one controllable switch of the power controller of the energy storage, for adjusting at least one electrical magnitude relating to the power supply between the power supply circuit of the transport system and the energy storage. The power controller of the energy storage is fitted to discharge the aforementioned energy storage with a power limitation.

In one embodiment of the invention the transport system is an elevator system without counterweight.

In one embodiment of the invention the energy storage comprises at least one supercapacitor.

In one embodiment of the invention the power control is fitted to limit the discharge power of the energy storage to a set limit value (Plim); the power control is fitted to determine the voltage of the energy storage (UE); and the power control is further fitted to determine the instantaneous limit value (Ilim) for the discharge current of the energy storage on the basis of the quotient $$I_{lim} = \frac{P_{lim}}{U_E}$$

between the aforementioned limit value of power (Plim) and the voltage of the energy storage (UE).

In one embodiment of the invention the power controller of the energy storage is fitted to precharge the energy storage with a power limitation during a standstill of the transport system, wherein the limit value of the precharging power is fitted to be smaller than the limit value of the discharge power of the energy storage during operation of the transport system.

In one embodiment of the invention the power supply arrangement comprises a precharging circuit for precharging the energy storage, which precharging circuit comprises at least one controllable switch, for disconnecting the current flowing in the precharging circuit.

In one embodiment of the invention the power supply circuit of the transport system comprises a frequency converter with intermediate circuit, and the power controller of the energy storage is connected to the intermediate circuit of the frequency converter, for supplying power between the intermediate circuit of the frequency converter and the energy storage.

In one embodiment of the invention the power supply arrangement comprises a precharging circuit for precharging the energy storage, which precharging circuit comprises a transformer connected to the power source of the transport system and also a rectifying bridge, which rectifying bridge is connected to the intermediate circuit of the frequency converter. The precharging current for precharging the energy storage is supplied to the energy storage via the precharging circuit and the power controller of the energy storage.

The apparatus according to the invention for storing energy, and also for discharging stored energy, is a power controller of the energy storage, which comprises at least one controllable switch, and which power controller of the energy storage comprises a connection to the power supply circuit of the transport system. The apparatus also comprises an energy storage, which is connected to the power controller of the energy storage; the apparatus further comprises a power control, which is fitted to control the aforementioned at least one controllable switch of the power controller of the energy storage, for adjusting at least one electrical magnitude relating to the power supply between the power supply circuit of the transport system and the energy storage. The power controller of the energy storage is fitted to discharge the aforementioned energy storage with a power limitation.

In the method according to the invention for supplying power in a transport system, a power controller of the energy storage is fitted to the power supply circuit of the transport system; at least one electrical magnitude relating to the power supply between the power supply circuit of the transport system and the energy storage is adjusted with the power control; and the energy storage is discharged with a power limitation.

In one embodiment of the invention a limit value for the precharging power of the energy storage is set; a limit value for the charging current of the energy storage is set; the energy storage is precharged with the power limitation of precharging power during a standstill of the transport system; and also the energy storage is charged with a current limitation during operation of the transport system.

In one embodiment of the invention the power controller of the energy storage is fitted to charge the aforementioned energy storage with a current limitation, and to discharge the aforementioned energy storage with a power limitation during operation of the transport system.

The controllable switch of the energy storage according to the invention can be a solid-state switch, such as an IGBT transistor, a MOSFET transistor, a thyristor, a bipolar transistor or an SCR (silicon controlled rectifier) switch. The controllable switch can also be a mechanical switch, such as a relay or contactor.

The power source of the transport system can be e.g. an electricity network, and the power source can also be some backup power source, such as a generator, a fuel cell or an accumulator.

The transport system according to the invention can be e.g. an elevator system, an escalator system, a travelator system, a direct drive elevator system or a crane system. A transport appliance refers to the moved part of a transport system, such as an elevator car or the moving track of an escalator/travelator. The transport appliance is moved during the operation of the transport system, whereas during a standstill of the transport system the transport appliance is essentially stationary. The elevator system according to the invention can be with machine room or without machine room. Further, the elevator system can be either with counterweight or without counterweight. In the invention the inertia of the transport appliance can thus be limited with respect to the masses of the transport appliance so that the ratio of the acceleration current and/or deceleration current of the motor to the corresponding current of even speed is smaller than in e.g. conventional elevator systems with counterweight. This type of transport system that is smaller in its inertia than a conventional one is e.g. the type of elevator system without counterweight presented in the publication WO 2005/049470 A2.

The motor according to the invention can be e.g. an alternating current motor or a direct current motor. This type of motor can be e.g. a synchronous motor, a squirrel-cage motor, a direct-current motor with or without brushes, a reluctance motor or a step motor. In the motor according to the invention the rotor can comprise a magnetization winding. The rotor can also be magnetized with permanent magnets. The motor can be either a rotating motor or a linear motor.

When an electric motor is used to move a transport appliance, the motor can also comprise a mechanical fitting for transmitting power between the motor and the transport appliance. This type of fitting can be e.g. a shaft, a gearbox or, for instance, the traction wheel of an elevator machine.

An electrical magnitude relating to the power supply between the power supply circuit of the transport system and the energy storage refers e.g. to the voltage, current and supply power of the energy storage and/or of the power controller of the energy storage.

In one embodiment of the invention the power controller of the energy storage is fitted to charge the energy storage with a current limitation, which current limitation means limitation of the charging current of the energy storage to a set limit value.

The power controller of the energy storage presented in the invention is fitted to discharge the energy storage with a power limitation, which power limitation means the discharge power of the energy storage is limited to a set limit value.

The power control of according to the invention can be implemented by programming e.g. with a microprocessor or with a programmable logic circuit, and it can also implemented, for instance, with integrated or discrete analog electronics or digital electronics.

In one embodiment of the invention the transport system comprises a determination of the load of the transport appliance. The discharge power of the energy storage is in this case limited to a set limit value, which limit value is selected on the basis of the determined load of the transport appliance.

In one embodiment of the invention the travel distance of the transport appliance is determined before the travel. The discharge power of the energy storage is in this case limited to a set limit value, which limit value is selected on the basis of the travel distance of the transport appliance. In an elevator system, for example, the aforementioned determination of the travel distance of the transport appliance can be performed on the basis of, for instance, a destination call of the elevator.

In one embodiment of the invention the energy storage comprises a lithium-ion accumulator.

In one embodiment of the invention the voltage of the energy storage refers to the voltage between the positive and the negative pole of the energy storage.

With the invention at least one of the following advantages, among others, is achieved:

Since the power controller of the energy storage is fitted to discharge the energy storage with a power limitation, the aforementioned power limitation can be performed using simply a determination of the electrical magnitude of the energy storage and/or of the power controller. In this case the power supply arrangement is simpler than in e.g. those prior-art arrangements in which the power supply of the aforementioned energy storage occurs on the basis of the instantaneous power of the mains electricity connection of the building. Since the discharge power of the energy storage is in this case limited to a set limit value, it is also easier than prior art to determine the total energy needed from the energy storage during the travel of the transport appliance.

In many transport systems the inertia of the transport appliance is thus limited with respect to the masses of the transport appliance so that the ratio of the acceleration current and/or deceleration current of the motor to the corresponding current of even speed is e.g. at most two and it is also possible that the acceleration current and/or deceleration current of the transport appliance and the current of even speed do not essentially differ from each other. When a power supply arrangement according to the invention is fitted into this type of transport system, and when the energy storage is in this case discharged with a power limitation for the duration of the travel of the transport appliance according to need, the power taken by the motor from the mains electricity connection and at the same time the dimensioning of the mains electricity connection can be essentially reduced.

Since the power supply arrangement comprises a precharging circuit, which comprises at least one controllable switch, for disconnecting the current flowing in the precharging circuit, the precharging of the energy storage can be performed also during a standstill of the transport system. In transport systems, such as elevator systems, the power supply circuit of the transport system is generally disconnected during a standstill of the transport system for the sake of safety, and separate charging of the energy storage via the power supply circuit of the transport system would in this case not necessarily otherwise be possible.

Figure 2:
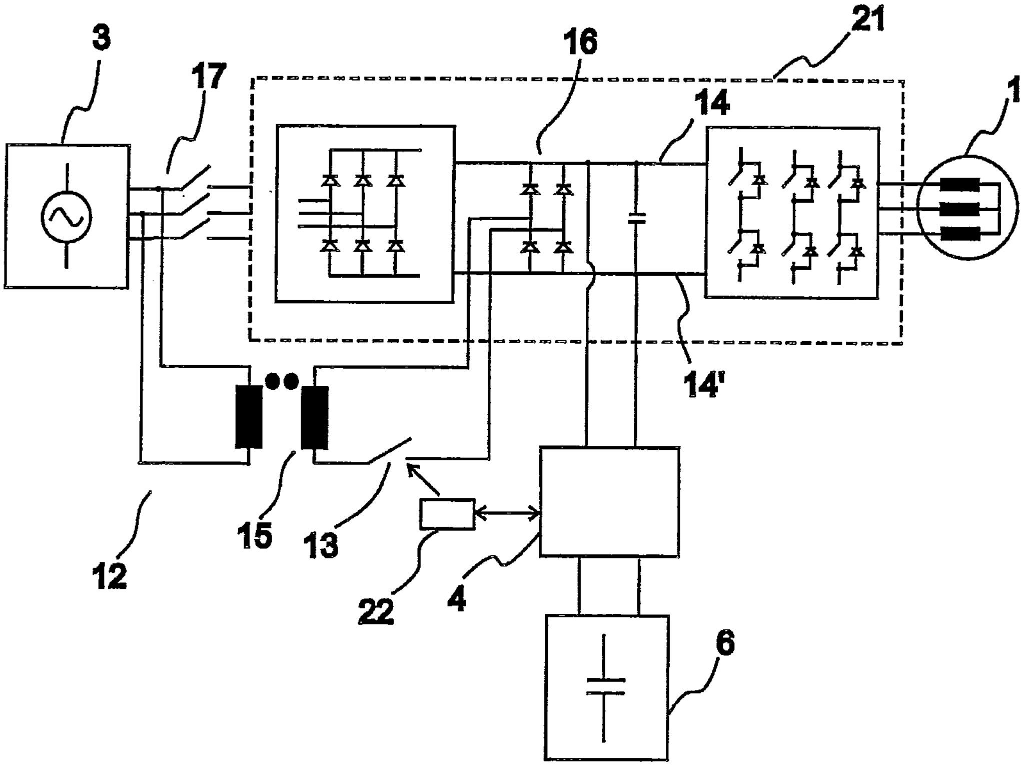
Figure 3:
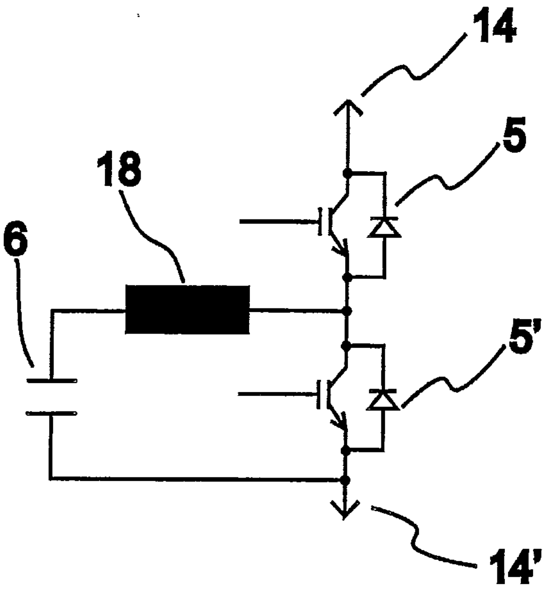
Figure 4:
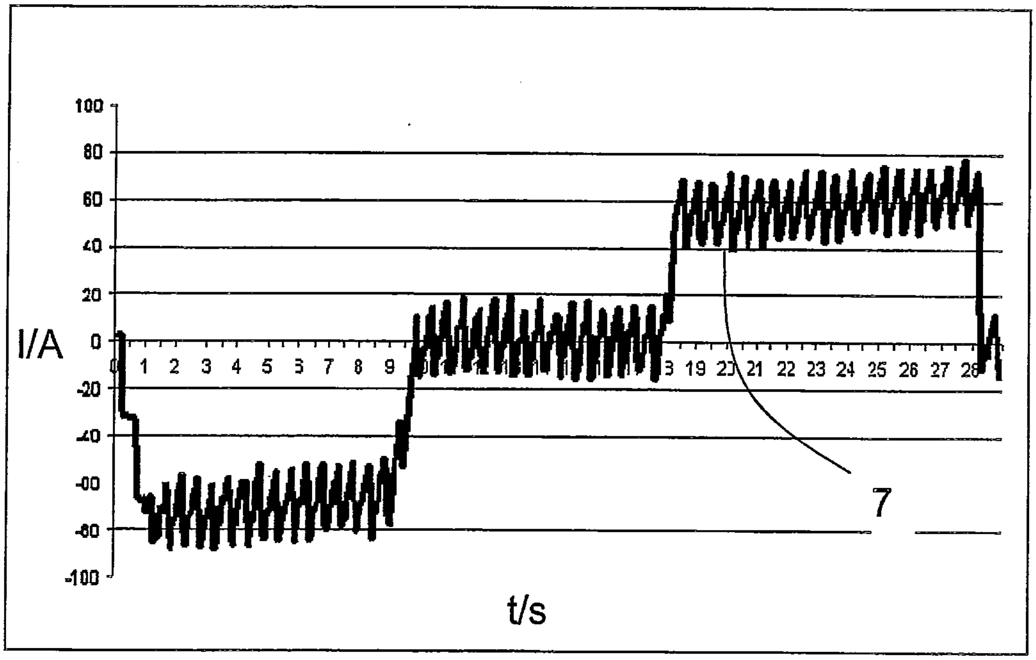
Figure 5:
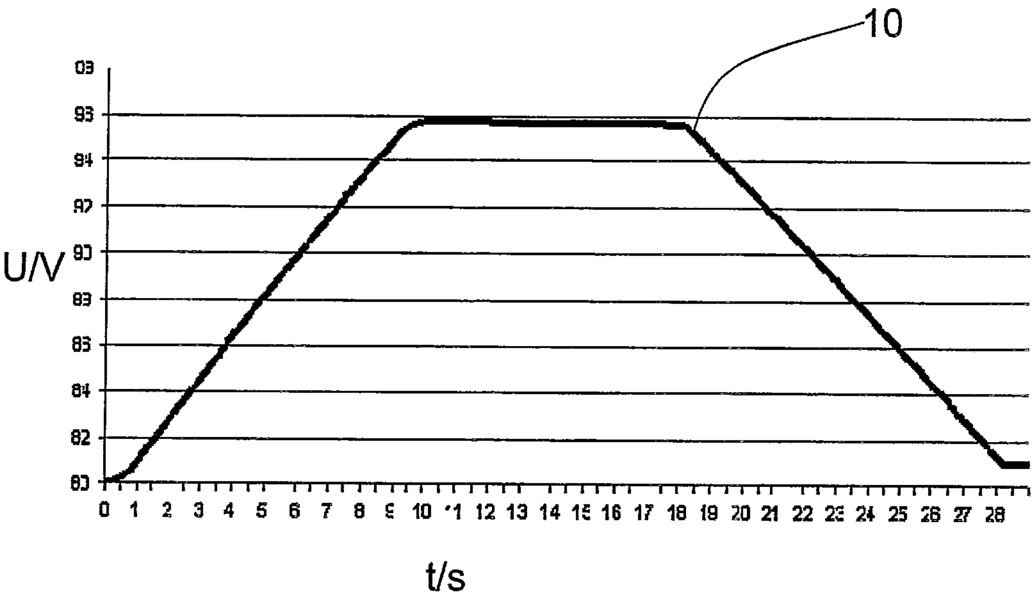
Figure 6:
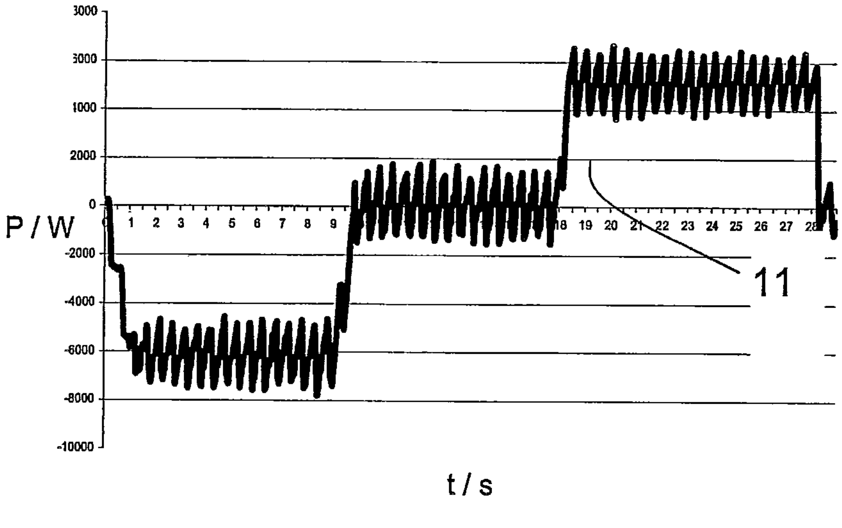
Figure 7:
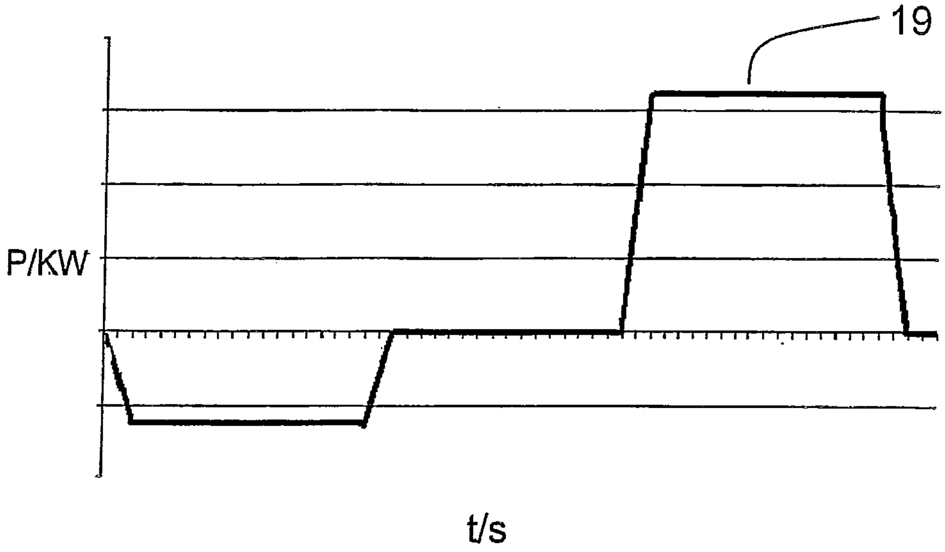
Figure 8:
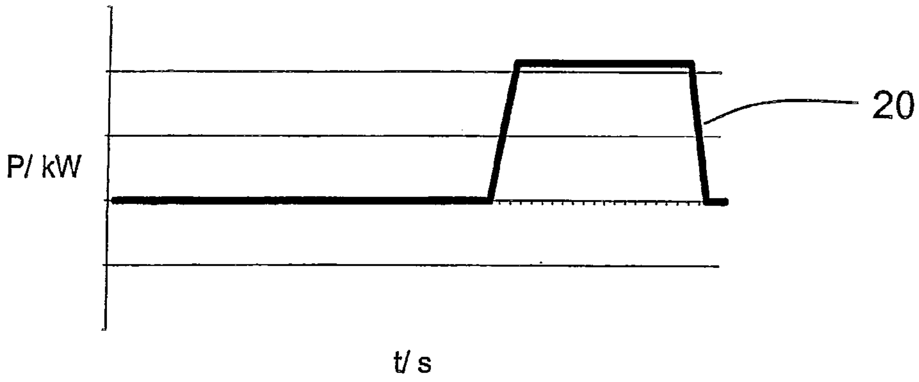
Figure 9:
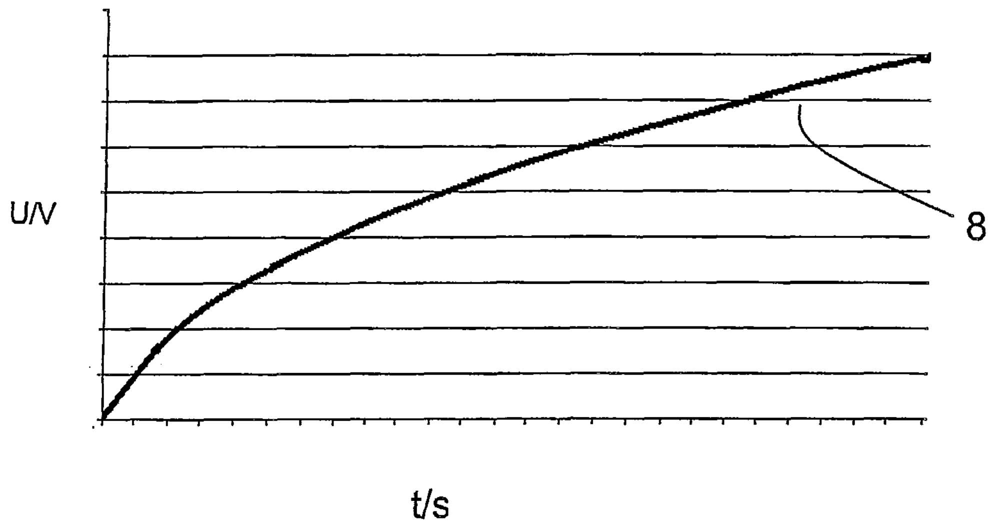
Figure 10:
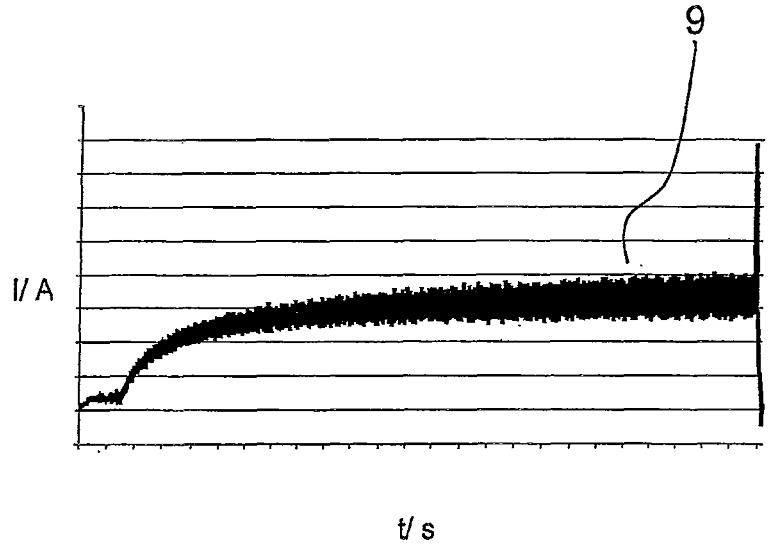

In the following, the invention will be described in more detail by the aid of a few examples of its embodiments with reference to the attached drawings, wherein FIG. 1 presents a power supply arrangement according to the invention FIG. 2 presents a second power supply arrangement according to the invention FIG. 3 presents a power controller of the energy storage according to the invention FIG. 4 presents the current of the energy storage in one power supply arrangement according to the invention FIG. 5 presents the voltage of the energy storage in one power supply arrangement according to the invention FIG. 6 presents the supply power of the energy storage in one power supply arrangement according to the invention FIG. 7 presents the supply power of the motor of a transport appliance in one power supply arrangement of a transport system according to the invention FIG. 8 presents the supply power of the power source of a transport system in one power supply arrangement according to the invention FIG. 9 presents the voltage of the energy storage in one power supply arrangement of a transport system according to the invention FIG. 10 presents the current of the energy storage in one power supply arrangement of a transport system according to the invention FIG. 1 presents a power supply arrangement of an elevator without counterweight. The power supply arrangement comprises a power supply circuit 2 of the elevator system. The elevator motor 1 is connected to the power supply circuit of the elevator system. Power supply to the elevator motor occurs from an electricity network 3 via the power supply circuit 2 of the elevator system. The power supply arrangement of the transport system also comprises an energy storage 6, as well as a power controller 4 of the energy storage. The energy storage 6 is connected to the power supply circuit 2 of the transport system via the power controller 4 of the energy storage. The energy storage comprises supercapacitors, which are connected to each other in series.

The energy storage 6 is discharged and charged with the power controller 4 of the energy storage for supplying power according to the power requirement of the elevator motor. When the elevator is driving in the direction of the essentially heavy loading of the motor, the force effect of the motor is in the direction of the movement of the elevator. In this case the energy storage is discharged with a power limitation during the whole elevator trip according to need, and the discharged power is supplied to the elevator motor via the power supply circuit of the elevator system. When the elevator is moving in the direction of the essentially light loading of the motor, the force effect of the motor is in the opposite direction to the movement of the elevator. In this case during motor braking power returns to the power supply circuit from the elevator motor, and the energy storage 6 is charged, with a current limitation, with the returning power.

The power controller of the energy storage comprises at least one controllable switch 5,5'. The power supply arrangement comprises a power control 22, which is fitted to control the aforementioned at least one controllable switch 5,5' of the power controller 4 of the energy storage, for adjusting at least one electrical magnitude 7,8,9,10,11 relating to the power supply between the power supply circuit of the transport system and the energy storage. Here the power control 22 measures the voltage and the current of the energy storage, and sets a direction and a magnitude for the power supply between the energy storage and the power supply circuit of the elevator system on the basis of the measured voltage and current. When the direction of the power supply is from the energy storage to the power supply circuit of the elevator system, the power control 22 limits the discharge power of the energy storage to the set limit value. The power control 22 in this case determines the instantaneous limit value $I_{lim}$ for the current of the energy storage on the basis of the aforementioned limit value of power $P_{lim}$ and the voltage of the energy storage $U_E$.

$$I_{lim} = \frac{P_{lim}}{U_E}$$

The power control 22 controls the aforementioned at least one controllable switch 5,5' of the power controller 4 of the energy storage such that the current is limited to its limit value set for this, in which case the energy storage 6 is discharged with a power limitation.

When the energy storage is discharged with the maximum permitted discharge power for the whole duration $t_s$ of elevator travel, an energy storage is needed that has a capacity $E_{tot}$ of at least:

$$E_{tot}=P_{lim}*t_s$$

The power controller 4 of the energy storage is fitted to charge the energy storage 6 with a current limitation during operation of the elevator system. The power control 22 controls the aforementioned controllable switch 5,5' of the power controller 4 of the energy storage such that the measured current of the energy storage is limited to the set limit value. The aforementioned limit value is selected according to the dimensioning of the controllable switch 5,5' such that the switch does not overload. This current limitation of the overload supervision of the switch is also in use when discharging the energy storage with a power limitation, but the power limitation normally in this case sets the permitted range of the current.

FIG. 2 presents a second power supply arrangement of a transport system. The power supply circuit of the transport system comprises a frequency converter 21 with intermediate circuit. The power controller 4 of the energy storage is connected to the intermediate circuit 14,14' of the frequency converter for supplying power between the intermediate circuit of the frequency converter and the energy storage 6. The network bridge of the frequency converter is connected to the electricity network 3, and the motor bridge is connected to the phases of the motor 1 that moves the transport appliance. The network bridge and the motor bridge are connected to each other with the aforementioned intermediate circuit 14,14'. Power supply between the electricity network 3 and the motor 1 of the transport system is for safety reasons disconnected with the contactor 17 during a standstill of the transport system.

The power supply arrangement also comprises a precharging circuit 12 for precharging the energy storage 6. The precharging circuit comprises a transformer 15 connected to the electricity network 3 and also a rectifying bridge 16, which is connected to the intermediate circuit 14,14' of the frequency converter. The precharging current for precharging the energy storage is in this case supplied to the energy storage via the precharging circuit 12 and the power controller 4 of the energy storage. The precharging circuit 12 also comprises a controllable switch 13 for disconnecting the current flowing in the precharging circuit. During a standstill of the transport system the power control 22 controls the switch closed, in which case precharging of the energy storage is possible during a standstill of the transport system despite the power supply between the electricity network 3 and the motor 1 of the transport system being disconnected as referred to previously with the contactor 17. The precharging current of the energy storage is limited with a current limitation. In addition, the charging power of the energy storage 6 during precharging is limited to the set limit value of the precharging power. The limit value of the precharging power is fitted to be smaller than the limit value of the discharge power during operation of the transport system. The aforementioned limit value of the precharging power is set on the basis of the power endurance of the transformer 15 of the precharging circuit 12.

FIG. 3 presents a power controller 4 of the energy storage. The positive pole of the energy storage 6 is connected to the first pole of the choke 18 of the power controller of the energy storage. The other pole of the choke 18 is connected to the output of the changeover switch 5,5'. The change-over switch comprises two controllable switches connected in series, of which the positive change-over contact 5 of the change-over switch is connected to the positive busbar 14 of the intermediate circuit of the frequency converter, and the negative change-over contact 5' is connected to the negative busbar 14' of the intermediate circuit of the frequency converter FIGS. 4-8 present the graphs of the electrical magnitudes of the energy storage of one elevator system without counterweight according to the invention as a function of time during operation of the elevator system.

At the time t=0, the elevator starts in the light direction downwards, in which case the energy storage starts to charge. The direction of the current 7 is in this case towards the energy storage, and the energy storage is charged with a current limitation. The current of the energy storage is in this case limited to the value −70 A. The voltage 10 of the energy storage starts to increase from its initial value 80V, to which initial value the supercapacitors of the energy storage are precharged during a standstill of the elevator system. When the elevator stops at the destination floor, the voltage of the capacitors has increased to a value of approx. 96V. After this the next run of the elevator occurs in the heavy direction upwards, in which case the energy storage discharges with a power limitation during all of the elevator travel. The discharge power 11 of the energy storage is in this case limited to the value 5 kW, and the direction 7 of the current of the energy storage is from the energy storage 6 to the power supply circuit 2 of the elevator system. The voltage 10 of the energy storage starts to decrease, and when the elevator stops at the next destination floor the voltage has dropped to a value of approx. 81V. The power 19 of the elevator motor is essentially constant during acceleration, even speed and deceleration of the elevator, because the inertia of an elevator system without counterweight is smaller than in a conventional elevator system with counterweight. In this case also the power 20 taken from the supply network decreases essentially when discharging the energy storage 6 according to the invention with a power limitation.

The ripple visible in the graphs 7,11,20 of current and instantaneous power results from the switching frequency fluctuation of the current of the energy storage 6, which is produced by the operation of at least one controllable switch 5,5' of the power controller 4 of the aforementioned energy storage. The switching frequency in this embodiment of the invention is 5 kilohertz, but the ripple caused by the switching frequency appears folded in the graphs owing to the low sampling frequency.

FIGS. 9 and 10 present the voltage and the current of the energy storage during precharging. At the time t=0 the energy storage starts to be charged at first with a current limitation, in which case the limit value for current is set at 70 A according to the current endurance of the switches of the power controller 4 of the energy storage. When the voltage of the energy storage has increased to approx. 14V, the charging current starts to decrease, limited by the power limitation of the precharging power. The limit value of the precharging power is here set at 1 kW.

The invention is not limited solely to the embodiments described above, but instead many variations are possible within the scope of the inventive concept defined by the claims below.

It is obvious to the person skilled in the art that in addition to the inertia of the transport appliance and to the masses to be moved, also e.g. the movement of the transport appliance, such as the value of the acceleration and deceleration of the transport appliance as well as e.g. the friction of the transport appliance, affect the ratio between the acceleration current and/or deceleration current of the transport appliance and the corresponding current of even speed in the transport system according to the invention.

The invention claimed is:

1. Power supply arrangement of a transport system, comprising:

- a motor for moving the transport appliance;
- a power supply circuit of the transport system, for supplying power between a power source of the transport system and the motor;
- a power controller of the energy storage, including at least one controllable switch
- an energy storage connected via the power controller of the energy storage to the power supply circuit of the transport system; and a power control configured to control the at least one controllable switch of the power controller to adjust a direction and electrical magnitude of the power supplied between the power supply circuit of the transport system and the energy storage, wherein when the direction of the power is from the energy storage to the power supply circuit, the power control limits the discharge power of the energy storage to a set limit value (Plim), and the power control is further configured to:

determine the voltage of the energy storage (UE); and determine the instantaneous limit value (Ilim) for the discharge current of the energy storage on the basis of the quotient $$\left(I_{lim} = \frac{P_{lim}}{U_E}\right)$$

between the set power limit value (Plim) and the voltage of the energy storage (UE).

2. Power supply arrangement according to claim 1, wherein the transport system is an elevator system without counterweight.

3. Power supply arrangement according to claim 1 or 2, wherein the energy storage comprises at least one supercapacitor.

4. Power supply arrangement according to claim 1, wherein the power controller of the energy storage is further controlled to precharge the energy storage with a power limitation during a standstill of the transport system, and wherein the limit value of the precharging power is smaller than the limit value of the discharge power of the energy storage during operation of the transport system.

5. Power supply arrangement according to claim 1, further comprising:

a precharging circuit for precharging the energy storage, the precharging circuit including at least one controllable switch for disconnecting the current flowing in the precharging circuit.

6. Power supply arrangement according to claim 1, wherein the power supply circuit of the transport system comprises a frequency converter with an intermediate circuit, and wherein the power controller of the energy storage is connected to the intermediate circuit of the frequency converter to supply power between the intermediate circuit of the frequency converter and the energy storage.

7. Power supply arrangement of a transport system, comprising:

a motor for moving a transport appliance;

a power supply circuit that supplies power between a power source of the transport system and the motor, the power supply circuit including a frequency converter with an intermediate circuit;

an energy storage connected via at least one controllable switch to the power supply circuit of the transport system;

a power control configured to control the at least one controllable switch of the energy storage to adjust at least one electrical magnitude relating to the power supply between the power supply circuit of the transport system and the energy storage, and to discharge the energy storage with a power limitation; and a precharging circuit for precharging the energy storage, the precharging circuit including a transformer connected to the power source of the transport system and a rectifying bridge connected to the intermediate circuit of the frequency converter, wherein a precharging current for precharging the energy storage is supplied to the energy storage via the precharging circuit and the at least one controllable switch of the energy storage.

* * * * *